United States Patent [19]

Tojo et al.

[11] Patent Number: 4,862,309

[45] Date of Patent: Aug. 29, 1989

[54] PROTECTION CIRCUIT FOR BATTERY FEED CIRCUIT

[75] Inventors: Toshiro Tojo; Kenji Takato; Kazumi Kinoshita; Yūzō Yamamoto, all of Kawasaki, Japan

[73] Assignee: Fujitsu Limited, Kawasaki, Japan

[21] Appl. No.: 207,635

[22] Filed: Jun. 16, 1988

[30] Foreign Application Priority Data

Jun. 17, 1987 [JP] Japan .............................. 62-150806
Dec. 11, 1987 [JP] Japan .............................. 62-312033
Dec. 22, 1987 [JP] Japan .............................. 62-326122
Mar. 9, 1988 [JP] Japan .............................. 63-055329

[51] Int. Cl.$^4$ .............................................. H02H 3/20
[52] U.S. Cl. ...................................... 361/56; 361/42; 361/91; 361/111; 361/119; 379/412
[58] Field of Search ..................... 361/54, 56, 91, 111, 361/42, 117, 118, 119; 379/331, 412

[56] References Cited

U.S. PATENT DOCUMENTS

| 4,495,536 | 1/1985 | Bynum | 361/111 X |
| 4,715,058 | 12/1987 | Lechner et al. | 361/91 X |
| 4,772,979 | 9/1988 | Arras | 361/91 X |

Primary Examiner—Derek S. Jennings
Attorney, Agent, or Firm—Staas & Halsey

[57] ABSTRACT

A protection circuit for a battery feed circuit used in a switching system. The protection circuit is comprised of: a supervising circuit for detecting an abnormal current flowing through a battery feed resistor; and a voltage limiting circuit for clamping a voltage across the battery feed resistor when the abnormal current is detected. Further, a control circuit is employed for stopping an operational amplifier, which is a component of a conventional battery feed circuit, when the abnormal current is detected.

19 Claims, 15 Drawing Sheets

PROTECTION CIRCUIT FOR BATTERY FEED CIRCUIT

1. Field of the Invention

The present invention relates to a switching system, more specifically it relates to a protection circuit for protecting a battery feed circuit in a line circuit from a ground fault and a false connection.

In a battery feed circuit, if a ground fault or a false connection occurs in a subscriber's line, an overcurrent flows in the battery feed circuit and, for example, burning occurs. Accordingly, a protection circuit is fitted to the battery feed circuit to protect the same when a ground fault or false connection occurs, by limiting the amount of overcurrent flowing therethrough.

2. Description of the Related Art

A prior art protection circuit is realized by inserting a well known limiting resistor between the subscriber's line and the battery feed circuit, only when a fault such as ground fault or false connection is detected, and another prior art protection circuit is realized by a plurality of auxiliary power transistors, connected in parallel with a main battery feed transistor, to cope with an overcurrent.

These two prior arts, however, have disadvantages in that, the protection circuit requires a large space for accommodating the same, and the number of discrete electric parts is increased. It should be noted that, since the protection circuits are mounted in a great number of the line circuits for each subscriber, the smaller the size and the lower the number of parts, the better.

SUMMARY OF THE INVENTION

Accordingly, an object of the present invention is to provide a protection circuit for a battery feed circuit, which protection circuit can be minituarized in the form of an integrated circuit (IC). To attain the above object, the protection circuit according to the present invention is realized by a voltage limiting circuit which limits the voltage across a battery feed resistor to a predetermined value when a fault is detected.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
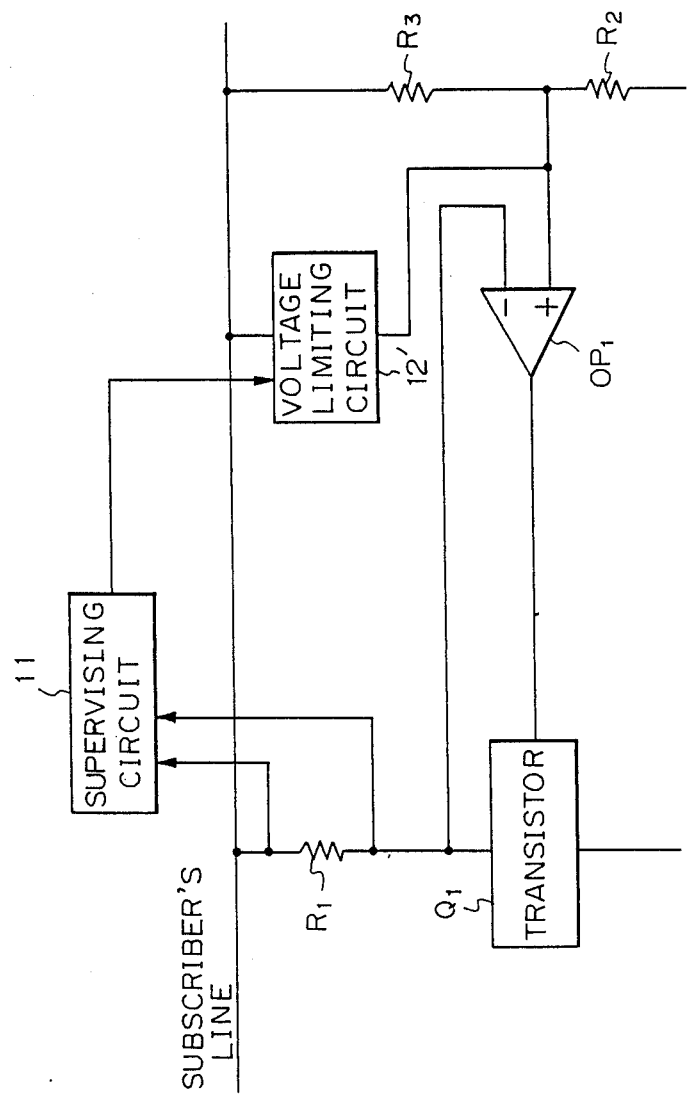
FIG. 1 is a block diagram of a protection circuit according to a first embodiment of the present invention.

FIG. 1 is a block diagram of a protection circuit according to a first embodiment of the present invention. In FIG. 1, $R_1$ denotes a battery feed resistor for determining a DC current supplied to the subscriber's line. The resistor $R_1$ is connected to a power source (not shown) via a battery feed transistor $Q_1$. The base of the transistor $Q_1$ is connected to the output of an operational amplifier $OP_1$, one of the inputs of which is connected to an intermediate connecting point between resistors $R_2$ and $R_3$ for determining an AC impedance of the battery feed circuit.

According to the present invention, a voltage limiting circuit 12' for the resistor $R_1$ is employed, which is controlled by a supervising circuit 11. Namely, if a fault occurs and an overcurrent is generated, the overcurrent is detected at the resistor $R_1$ by the supervising circuit 11, and the circuit 11 commands the circuit 12' to clamp the voltage across the resistor $R_1$ at a predetermined voltage.

Figure 2:
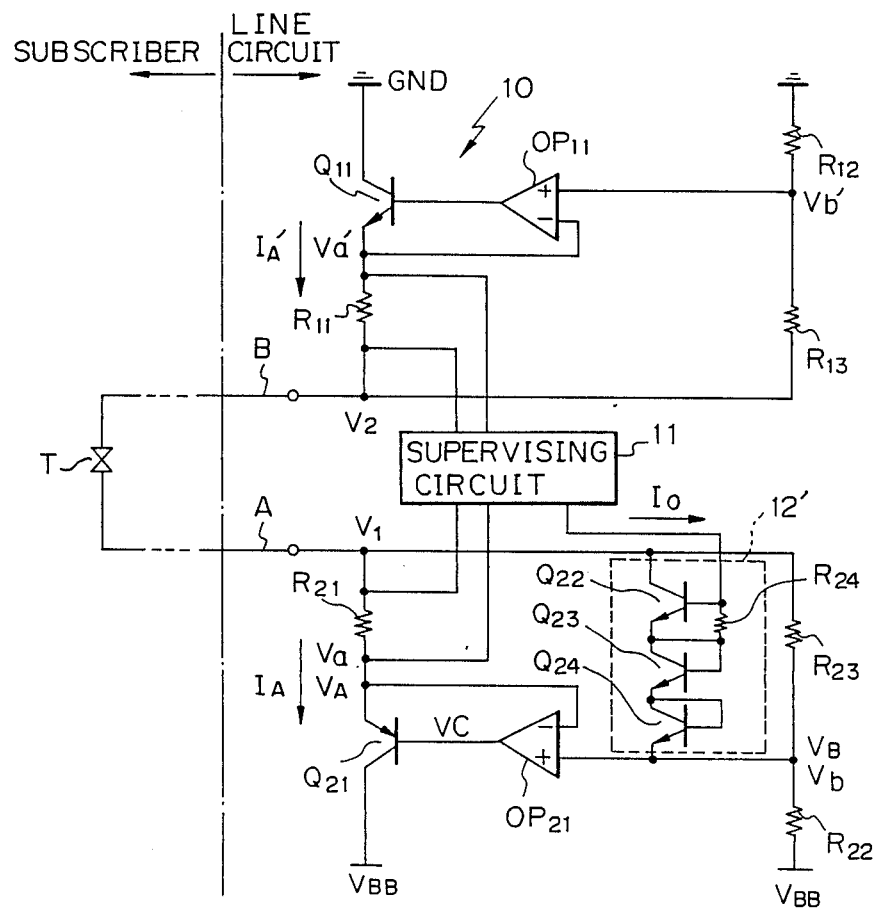
FIG. 2 is a detailed circuit diagram of the first embodiment shown, in FIG. 1.

FIG. 2 is a detailed circuit diagram of the first embodiment shown in FIG. 1. In FIG. 2, only a protection circuit for a protection against a ground fault is illustrated for brevity, but a protection circuit for protection against a false connection also can be mounted. In FIG. 2, in addition to the supervising circuit 11 and the voltage limiting circuit 12' comprised of transistors $Q_{22}$ through $Q_{24}$ and resistor $R_{24}$, a battery feed circuit 10 is illustrated, which is mounted in a corresponding line circuit for a related telephone terminal equipment T connected via the subscriber's lines, i.e., the A line and the B line. The battery feed circuit 10 has a symmetric construction with respect to the A and B lines, and therefore, the following explanation will be made with reference mainly to the circuit part of the A line, i.e., the bottom half portion of the Figure.

Resistors $R_{12}$ and $R_{13}$ (B line side) comprising a voltage divider are connected between a ground GND and the B line. Similarly, for the A line, resistors $R_{22}$ and $R_{23}$ are connected between a power source $V_{BB}$, e.g., −48 V, and the A line. When the telephone terminal T is in the off-hook state, a DC current flows from the ground GND to the power source $V_{BB}$ via the resistors $R_{12}$ and $R_{13}$, the telephone terminal T, and the resistors $R_{23}$ and $R_{22}$. Accordingly, a voltage $V_B$ appears at the intermediate connecting point between the resistors $R_{23}$ and $R_{22}$. On the other hand, the battery feed transistor $Q_{21}$ is connected, via the battery feed resistor $R_{21}$, between the A line and the power source $V_{BB}$. The connection point $V_B$ is connected to a noninverting input terminal (+) of the operational amplifier $OP_{21}$, the inverting input terminal (−) of which is connected to the emitter of the battery feed transistor $Q_{21}$ and the base of which is connected to the output of the amplifier $Q_{21}$. At the operational amplifier $OP_{21}$, a voltage equal to the voltage $V_B$ appearing at the noninverting input (+) develops at the inverting input (−), due to an imaginary short, and thus the same voltage appears as $V_A$ at the emitter of the transistor $Q_{21}$, to obtain $V_A = V_B$. The battery feed transistor $Q_{21}$ works as a current source in which a current defined by $V_B/R_{21}$ flows through the transistor $Q_{21}$ as shown by $I_A$, i.e., $I_A = V_B/R_{21}$.

When viewed from the A line side, and disregarding the resistors $R_{22}$ and $R_{23}$, the resistance value, i.e., $R_A$, of the battery feed circuit 10 is expressed as follows, where $V_1$ denotes a voltage of the A line.

$$R_A = V_1/I_A$$

Since the voltage $V_B$ is expressed as $V_B = V_1 \times R_{23}/(R_{22}+R_{23})$, $R_A$ can be rewritten as $$R_A = R_{21} \times (R_{24}+R_{23})/R_{23}$$

which means that a DC resistance value of the battery feed circuit 10 is constant.

This is also true for the B line side. Namely, the DC resistance value, at the B line side, of the battery feed circuit 10 is made equal to the constant value of the A line side by a suitable circuit arrangement. In this case, the DC resistance values of the A and B line sides are usually made equal and selected to be a relatively low value, such as about 200 Ω.

When a speech signal is generated at the telephone equipment terminal T, an AC voltage differentially appears between the A and B lines. That is, when the voltage on the A line is increased or decreased, the voltage on the B line is decreased or increased, respectively. The AC voltage across the A and B lines is divided by the resistors $R_{22}$ and $R_{23}$ and produces a voltage $V_b$ at the intermediate connecting point therebetween. The voltage $V_b$ induces an AC voltage $V_b$ at the inverting input (−) of the operational amplifier $OP_{21}$. On the other hand, the AC voltage on the B line is divided by the resistors $R_{12}$ and $R_{13}$ to produce a voltage $V_b'$. The voltage $V_b'$ is applied to the non-inverting input (+) of an operational amplifier $OP_{11}$ to produce an identical AC voltage $V_b'$ at the inverting input (−) thereof.

Accordingly, the AC voltages appearing at the emitters of the battery feed transistors $Q_{21}$ and $Q_{11}$ are identical to those appearing on the A and B lines, respectively, and thus an AC current (speech current) does not flow through the transistors $Q_{21}$ and $Q_{11}$. Therefore, the respective AC impedances are defined by the resistors $R_{22}$ and $R_{23}$ (A line side) and the resistors $R_{12}$ and $R_{13}$ (B line side), respectively, to obtain a relatively high constant value, such as several tens of kΩ.

In FIG. 2, the voltage limiting circuit 12' is comprised of three transistors connected in series, each having the same conductivity type (a PNP type is used in FIG. 2). The first transistor is a saturation transistor having a resistor between the base and the emitter thereof, the base receiving a first control signal, i.e., a detection current $I_0$. The second and third transistors are each connected in the form of a diode. If a ground fault does not occur at the A line, a detection current $I_0$, i.e., a first control signal, is not provided from the supervising circuit 11. Accordingly, in the voltage limiting circuit 12', a current does not flow through the transistor $Q_{22}$, but if a ground fault does occur at the A line side, the current $I_A$ is increased. The supervising circuit 11 detects the thus increased current $I_A$ by watching the voltage across the resistor $R_{21}$ and producing the detection current $I_0$. Accordingly, the transistor $Q_{22}$ is saturated and the internal resistance value is reduced. Therefore, the voltage $V_B$ is determined by both the base-emitter voltages ($V_{BE}$) of the transistors $Q_{23}$ and $Q_{24}$, each connected in the form of a diode, whereby $V_B = 2 \times V_{BE}$ is obtained, and thus the current $I_A$ is determined as $I_A = 2 \times V_{BE}/R_{21}$. Suppose that the voltage limiting circuit 12', comprised of the transistors $Q_{22}$, $Q_{23}$ and $Q_{24}$ and the resistor $R_{24}$, is not included, and in addition $R_{23} = R_{22}$ stands, then $V_B = V_{BB}/2$ is obtained. In this case, the current $I_A$ is equal to $V_{BB}/2 \times R_{21}$ and larger than a rated current value. Under this condition, the transistor $Q_{21}$ and the resistor $R_{21}$ may be damaged by burning. In the circuit of FIG. 2, this possibility is eliminated because the voltage limiting circuit 12' is employed.

If a false connection occurs, i.e., the power source $V_{BB}$ comes into contact with the B line, a voltage limiting circuit identical to the above-mentioned circuit 12' will protect the battery feed transistor $Q_{11}$ and resistor $R_{11}$ from damage by burning.

Next, a protection circuit according to a second embodiment of the present invention will be explained.

Regarding the protection circuit of the first embodiment shown in FIGS. 1 and 2, the voltage limiting circuit 12' is directly incorporated into a portion where high impedance against the AC voltage is created. Accordingly, during protection against the ground fault, the voltage across the resistor $R_{23}$ is limited by the circuit 12', and therefore, the AC impedances at the A and B lines are unbalanced. This condition is worsened because the unbalanced impedances induce an oscillation inside the battery feed circuit 10, and this undesired oscillation current is superimposed onto the DC current $I_A$. The protection circuit according to the present invention eliminates the above-mentioned problem of undesired oscillation.

Figure 3:
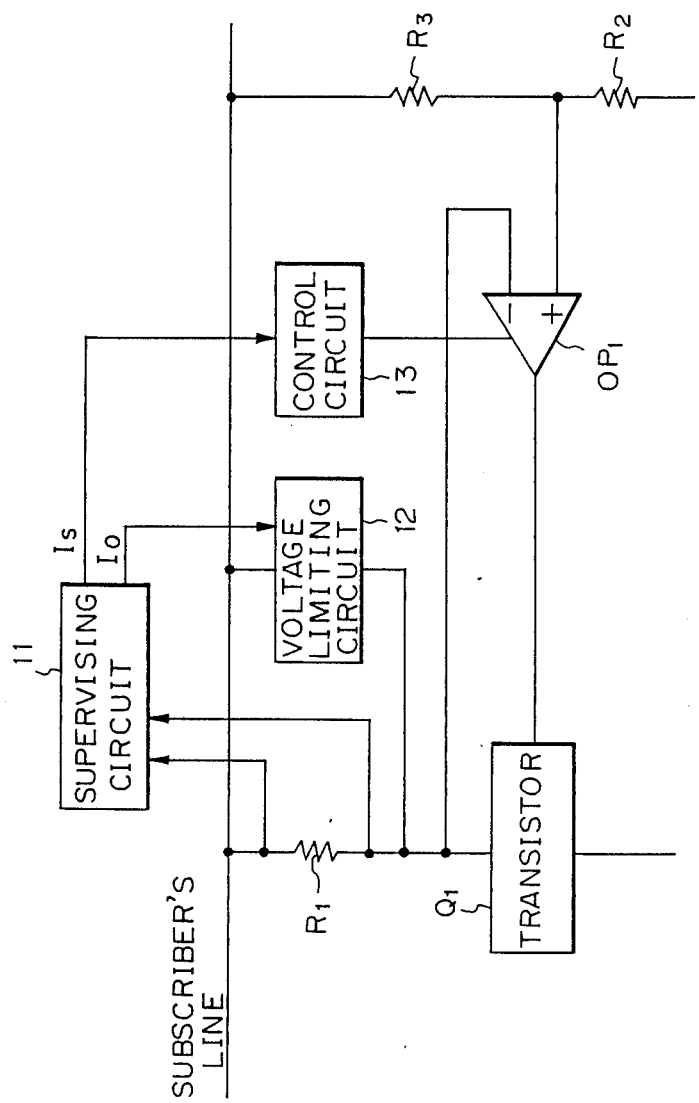
FIG. 3 is a block diagram of a protection circuit according to a second embodiment of the present invention.

FIG. 3 is a block diagram of a protection circuit according to a second embodiment of the present invention. As shown in FIG. 3, the protection circuit of the second embodiment is comprised of the aforesaid supervising circuit 11, a voltage limiting circuit 12 which is slightly different from the aforesaid circuit 12', and an operational amplifier control circuit 13. The supervising circuit 11 detects the voltage across the battery feed resistor $R_1$ to produce a first control signal and a second control signal, $I_O$ and $I_S$, respectively.

The voltage limiting circuit 12 is connected between both ends of the battery feed resistor $R_1$ to limit the voltage across the battery feed resistor $R_1$ in accordance with the first control signal $I_0$ (detection current), and the operational amplifier control circuit 13 stops the operation of the amplifier $OP_1$ in accordance with the second control signal $I_S$, i.e., a stop control current.

When a fault such as a ground fault or false connection, occurs, an overcurrent flows and the voltage across the resistor $R_1$ becomes large. This large voltage is detected by the supervising circuit 11 which then produces the first and second control signals $I_O$ and $I_S$. Upon receiving the signal $I_0$, the circuit 12 operates to limit the voltage across the resistor $R_1$, and the control circuit 13 operates to stop the operation of the operational amplifier $OP_1$ in response to the second control signal $I_S$, and thus the current flowing through the resistor $R_1$ is reduced. Accordingly, the resistor $R_1$ and the transistor $Q_1$, both defining the DC current resistance value, are protected.

In the above arrangement, the voltage limiting circuit 12 is not directly connected with the resistors $R_2$ and $R_3$, both defining the aforesaid AC impedance, and accordingly, the AC impedance is not varied by the addition of the circuit 12. Therefore, an imbalance in the AC impedance between the A and B lines is not created, and thus a deleterious oscillation is not generated in the battery feed circuit.

Figure 4:
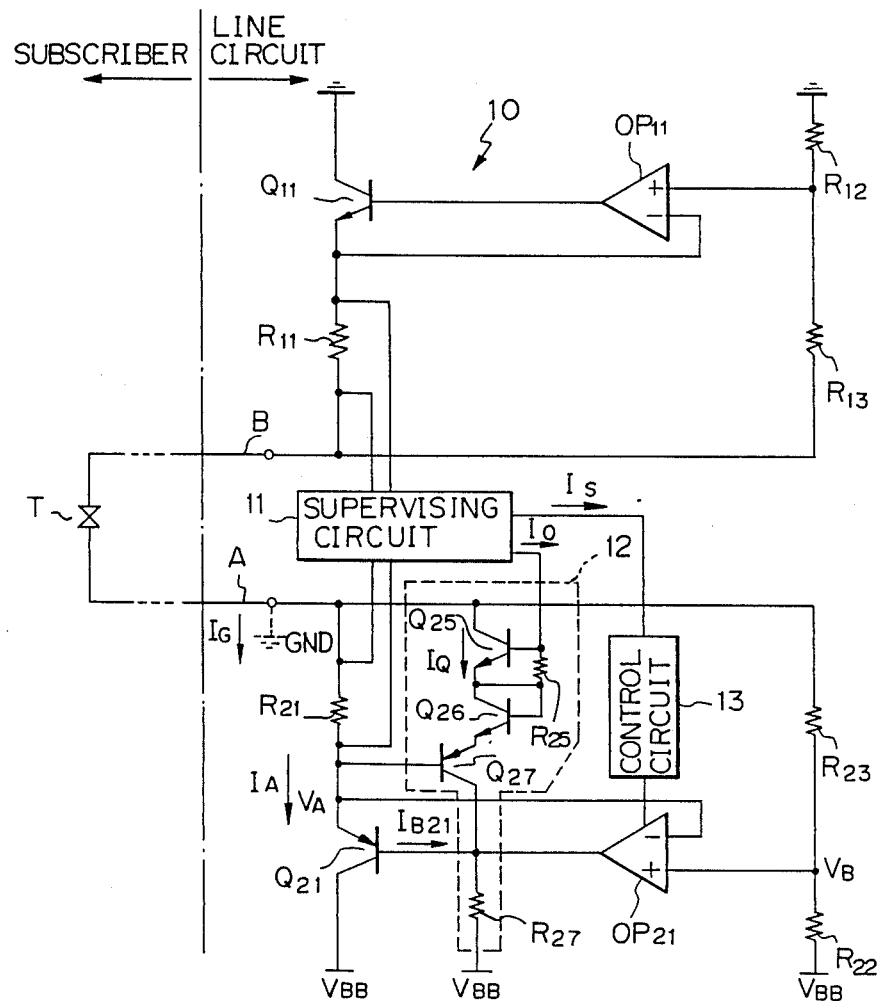
FIG. 4 is a detailed circuit diagram of the second embodiment shown in FIG. 3.

FIG. 4 is a detailed circuit diagram of the second embodiment shown in FIG. 3. It should be understood that the protection circuit of FIG. 4 is designed to cope with, for example, a ground fault, and members identical to those explained before are given the same reference numerals or symbols (as for all later figures).

The voltage limiting circuit 12 is comprised of a first saturation transistor receiving, at the base thereof, the first control signal $I_0$, a second transistor connected in the form of a diode, both of which have the same conductivity type and are connected in series, and a third transistor having another conductivity type, the base of which is connected with the emitter of the battery feed transistor, and these three series-connected transistors are connected between the subscriber's line and the base of the battery feed transistor. Specifically, the voltage limiting circuit 12 is comprised of transistors $Q_{25}$ and $Q_{26}$, both of which are NPN type, a PNP type transistor $Q_{27}$, and resistors $R_{25}$ and $R_{27}$. The transistors $Q_{25}$ through $Q_{27}$ are inserted between the A line and the base of the battery feed transistor $Q_{21}$, and the transistor $Q_{26}$ is connected in the form of a diode. Further, the base of the transistor $Q_{27}$ is connected to the emitter of the transistor $Q_{21}$. The operational amplifier control circuit 13 is connected between the supervising circuit 11 and the operational amplifier $OP_{21}$.

The operation of the battery feed circuit 10 shown in FIG. 4 is substantially the same as that of the corresponding circuit shown in FIG. 2. When a ground fault does not (see broken line GND) occur on the A line, the supervising circuit 11 does not provide a current $I_0$, and accordingly, a current does not flow through the transistor $Q_{25}$, and thus there is no operational change in the battery feed circuit 10.

Conversely, if a ground fault does occur on the A line, the battery feed current $I_A$ is increased, and the related increase is detected as an increased voltage across the battery feed resistor $R_{21}$ which then produces the current $I_0$. Accordingly, the transistor $Q_{25}$ is saturated and the internal resistance value thereof is reduced. Therefore, the voltage $V_A$ at the battery feed resistor $R_{21}$ is limited to the sum of the base-emitter voltages $V_{BE26}$ and $V_{BE27}$ of the corresponding transistors $Q_{26}$ and $Q_{27}$. In this case, the ground fault current $I_G$ is expressed as $$I_G = V_A/R_{21} = (V_{BE26} + V_{BE27})/R_{21}$$

As explained previously, where $R_{22} = R_{23}$ stands and the transistors $Q_{25}$ through $Q_{27}$ and the resistor $R_{25}$ are omitted, the ground fault current $I_G$ equals $V_{BB}/2 \times R_{21}$, which is larger than the rated current value. Conversely, in FIG. 4, the ground fault current $I_G$ is made small, and thus the object of the present invention is realized. In this case, the output current of the operational amplifier $OP_{21}$ is very large, and therefore, the base current $I_{BE21}$ of the transistor $Q_{21}$ and the current flowing through the transistors $Q_{25}$ through $Q_{27}$ becomes large. In a condition where the currents $I_{B21}$ and $I_Q$ are not limited, even if the supervising circuit 11 supplies the detection signal $I_0$ to the transistor $Q_{25}$. The transistor $Q_{25}$ remains nonsaturated, and accordingly, the voltage $V_A$ at the resistor $R_{21}$ is not reduced, and thus it is not possible to limit the ground fault current $I_G$.

To avoid the above-mentioned condition, during a protection against a ground fault, the supervising circuit 11 produces a second control signal, i.e., a stop control current $I_S$, and supplies tat signal to an operational amplifier control circuit 13. Accordingly, the circuit 13 turns the current source OFF, which supplies power to the operational amplifier $OP_{21}$, and thus, during the protection against a ground fault, the operation of the operational amplifier $OP_{21}$ is stopped.

In the above-mentioned operation, the currents $I_{B21}$ and $I_Q$ are made small and the ground fault current $I_G$ is limited by the transistors $Q_{25}$ through $Q_{27}$ to the current $I_0$ flowing through the resistor $R_{25}$. In this case, the resistor $R_{27}$ (as for a resistor $R_{17}$ in FIG. 5) maintains the battery feed transistor $Q_{21}$ in an active state, and the base current of $Q_{21}$ flows through resistor $R_{27}$. Namely, the resistor $R_{27}$ acts as a hold resistor for holding the transistor $Q_{27}$ in an active state.

Use of the circuit shown in FIG. 4 ensures that an imbalance in the AC impedance between the A and B line is not created, since the transistors $Q_{25}$ through $Q_{27}$ as the voltage limiting circuit are not connected to the resistors $R_{22}$, $R_{23}$ (as in FIG. 2) but to the base of the transistor $Q_{21}$, and accordingly, the aforesaid undesired oscillation is not induced in the battery feed circuit.

Figure 5:
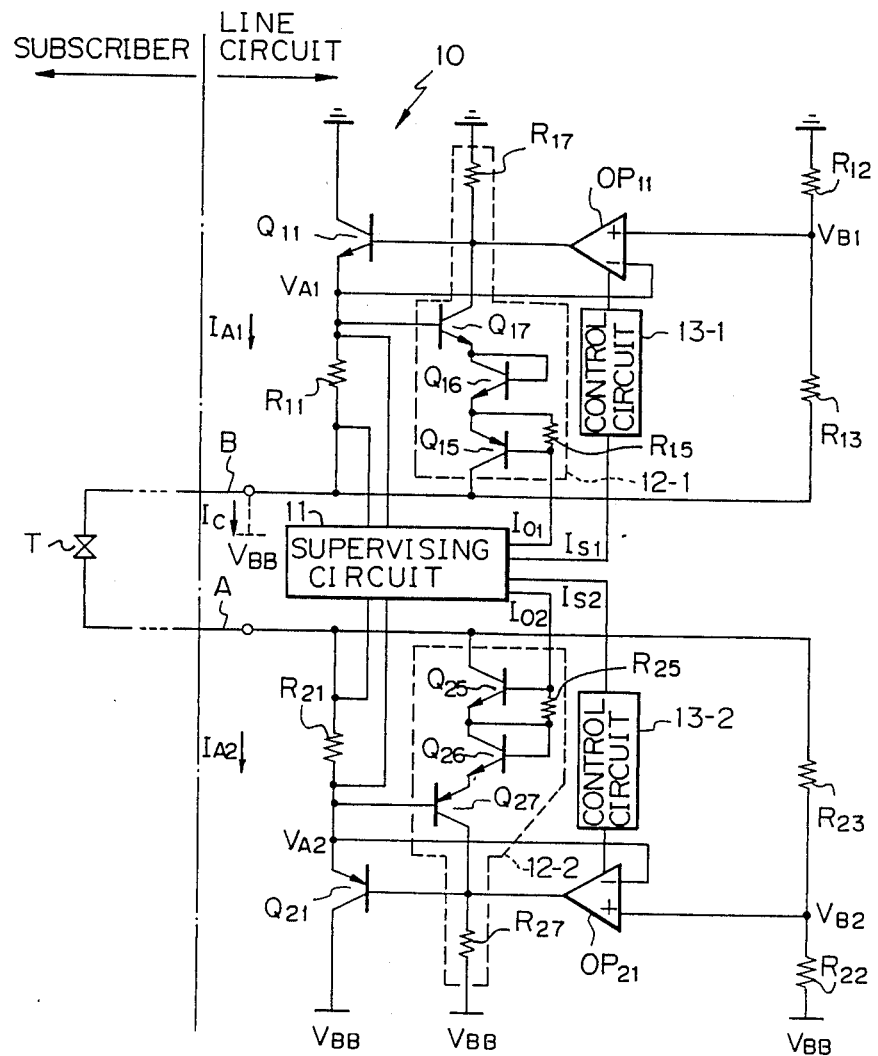
FIG. 5 is a circuit diagram of an example of an application of the second embodiment of the present invention.

FIG. 5 is a circuit diagram of an example of an application of the second embodiment of the present invention. In this example, the protection circuit can cope with not only a ground fault on the A line, but also with a false connection of the B line to the power source $V_{BB}$, e.g., $-48$ V. In FIG. 5, reference numeral 12-1 is a voltage limiting circuit which contains transistors $Q_{15}$, $Q_{16}$, and $Q_{17}$ and resistors $R_{15}$ and $R_{17}$, and reference numeral 13-1 represents an operational amplifier control circuit.

In FIG. 5, the construction and the operation of the battery feed circuit 10 for the A and B lines are substantially the same as those explained before with reference to FIGS. 2 and 4. Also, the construction and the operation of the voltage limiting circuit 12-2, containing the transistors $Q_{25}$, $Q_{26}$, $Q_{27}$ and the resistors $R_{25}$ and $R_{27}$, and the control circuit 13-2, are identical to those explained before with reference to FIG. 4.

The voltage limiting circuit 12-1 comprised of the transistors $Q_{15}$, $Q_{16}$, $Q_{17}$ and the resistors $R_{15}$ and $R_{17}$ is used for protection against an overcurrent produced when a false connection occurs. As shown in the Figure, the transistors $Q_{15}$ through $Q_{17}$ are connected between the B line and the base of the transistor $Q_{11}$, the transistor $Q_{16}$ is connected in the form of a diode, and the transistor $Q_{17}$ is connected, at the base thereof, with the emitter of the battery feed transistor $Q_{11}$.

In FIG. 5, when a false connection does not occur, a detection current $I_{01}$ is not absorbed by the supervising circuit 11, and accordingly, a current is not provided from the transistor $Q_{15}$, and thus there is no change in the operation of the battery feed circuit 10. Conversely, if a false connection occurs on the B line, the battery feed current $I_{A1}$ is increased, and this increase is detected as an increased voltage across the battery feed resistor $R_{11}$ by the supervising circuit 11, which absorbs the detection current $I_{01}$. Accordingly, the transistor $Q_{15}$ is saturated and the internal resistance value thereof reduced. Therefore, the voltage $V_{A1}$ across the resistor $R_{11}$ is limited to the sum of the base-emitter voltages $V_{BE16}$ and $V_{BE17}$ of the respective transistors $Q_{16}$ and $Q_{17}$. In this case, a false connection current $I_C$ is expressed as follows.

$$I_C = V_{A1}/R_{11} = (V_{BE16} + V_{BE17})/R_{11}$$

A current $I_C$, when the transistors $Q_{15}$ through $Q_{17}$ and the resistor $R_{15}$ are omitted, is $V_{BB}/2 \times R_{11}$ (when $R_{12} = R_{13}$) and is larger than the rated current value. Nevertheless, in the circuit of FIG. 5, the current $I_C$ is reduced to the above defined value, and thus the purpose of the present invention is realized.

In this case, as already mentioned, the supervising circuit 11 must also supply a second control signal, i.e., a stop control current $I_{S1}$, to the control circuit 13-1, at the same time as the detection current $I_{01}$ is absorbed by the circuit 11, so that the circuit 13-1 turn the current source OFF, which supplies power to the operational amplifier $OP_{11}$, and thus, the operation of the amplifier $OP_{11}$ is stopped.

When the circuit shown in FIG. 5 is used, an imbalance in the AC impedance between the A and B line sides is not created, since the transistors $Q_{15}$ through $Q_{17}$ as the voltage limiting circuit are not connected to the resistors $R_{12}$, $R_{13}$ (as in FIG. 2) but to the base of the transistor $Q_{11}$, and accordingly, the aforesaid undesired oscillation is not induced in the battery feed circuit during the protection against a false connection.

Figure 6:
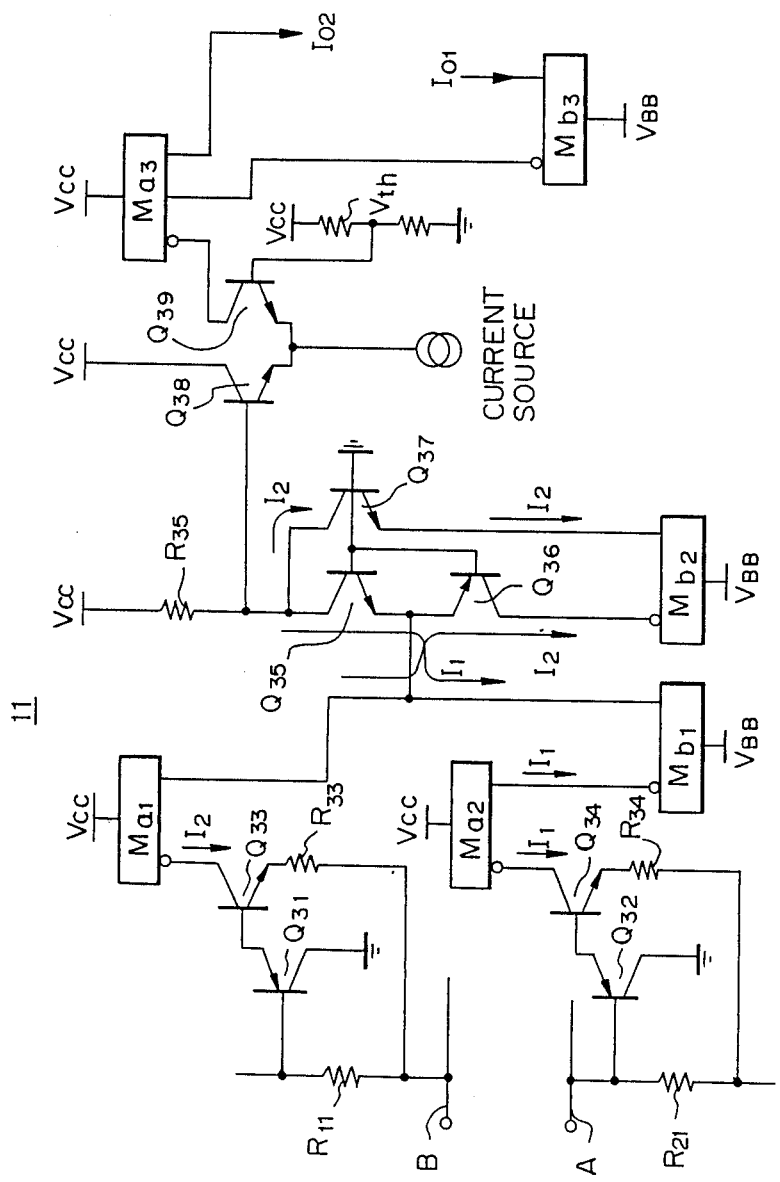
FIG. 6 is a circuit diagram of an example of the supervising circuit.

FIG. 6 is a circuit diagram of an example of the supervising circuit. Reference characters $R_{11}$ and $R_{21}$ denote the aforesaid battery feed resistors, $Q_{31}$ through $Q_{39}$ are transistors, $R_{33}$, $R_{34}$ and $R_{35}$ are resistors, and $M_{a1}$, $M_{a2}$, $M_{a3}$ and $M_{b1}$, $M_{b2}$ and $M_{b3}$ are current mirror circuits.

When a ground fault occurs, an overcurrent flows through the battery feed resistor $R_{21}$, and in response to this overcurrent, a voltage which is the same as the voltage across the battery feed resistor $R_{21}$ is generated, via the transistors $Q_{32}$ and $Q_{34}$, at the resistor $R_{34}$ forming an emitter circuit of the transistor $Q_{34}$. The generated voltage causes the mirror circuit $M_{a2}$ to be made ON and output a current $I_1$ therefrom. An identical current $I_1$ is output therefrom to the mirror circuit $M_{b1}$, and accordingly, the circuit $M_{b1}$ is made ON and an identical current is given to $M_{b1}$. This current flows via the transistor $Q_{35}$ and creates a voltage drop across the resistor $R_{35}$, and this voltage drop is compared with a threshold voltage $V_{th}$ at a comparator comprised of the transistors $Q_{38}$ and $Q_{39}$. When the current voltage also exceeds the threshold voltage $V_{th}$, a signal is output to the mirror circuit $M_{a3}$ to make $M_{a3}$ ON and thus output the detection current $I_{02}$. The current $I_{02}$ is supplied, as explained with reference to FIGS. 4 and 5, to the voltage limiting circuit 12 upon the detection of a ground fault.

When a false connection occurs, an overcurrent flows through the battery feed resistor $R_{11}$ and a voltage which is the same as the voltage across $R_{11}$ is generated, via the transistors $Q_{31}$ and $Q_{33}$, at the resistor $R_{33}$ forming the emitter circuit of the transistor $Q_{33}$. This generated voltage causes a current $I_2$ to flow from the mirror circuit $M_{a1}$, and a current $I_2$ identical to the above current $I_2$ is output, via the transistor $Q_{36}$, to the mirror circuit $M_{b2}$. Accordingly, a current $I_2$ is output via the transistor $Q_{37}$ to the mirror circuit $M_{b2}$ to produce a voltage drop across the resistor $R_{35}$. When the voltage drop exceeds the threshold voltage $V_{th}$ at the comparator ($Q_{38}$, $Q_{39}$), a current flowing through the transistor $Q_{39}$ is drawn from the mirror circuit $M_{a3}$, an identical current is output to the mirror circuit $M_{b3}$, and a current $I_{01}$ is obtained. The current $I_{01}$ is output, as previously explained in FIG. 5, to the voltage limiting circuit 12-1 when a false connection occurs.

The ON-OFF control of the operational amplifiers $OP_{21}$ and $OP_{11}$ can be effected by the second control signals, i.e., the stop control currents, which can be produced in the same manner as the aforesaid currents $I_{01}$ and $I_{02}$, which stop control currents are output to the respective control circuits 13-1 and 13-2, which make the corresponding current sources OFF to stop the operation of the operational amplifiers.

Figure 7:
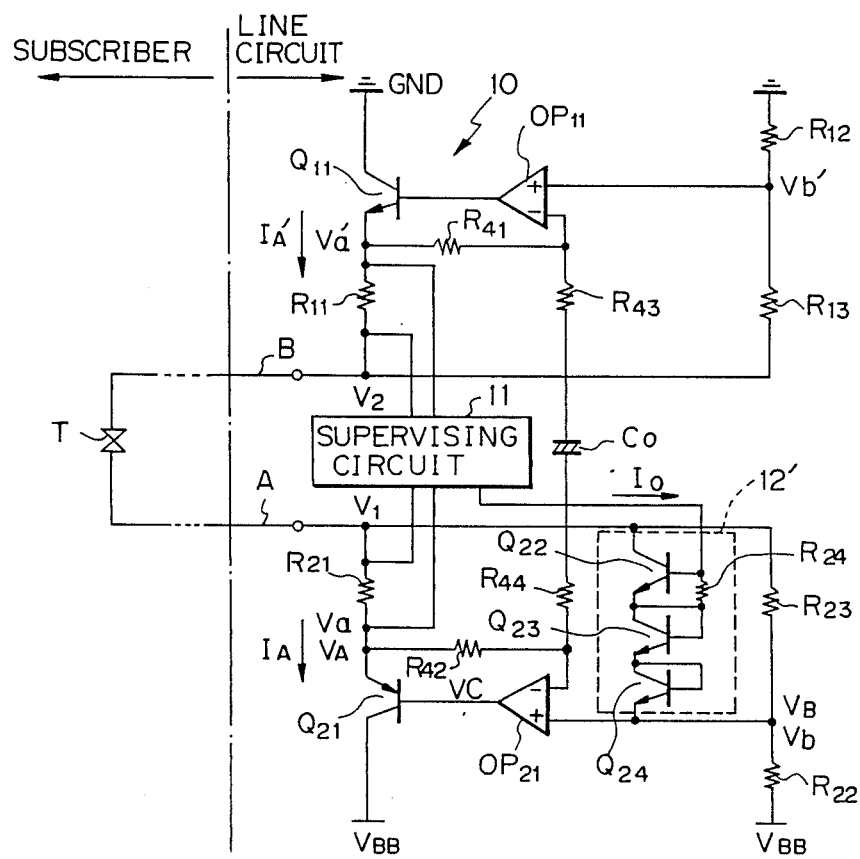
FIG. 7 is a circuit diagram of another type of battery feed circuit.

FIG. 7 is a circuit diagram of another type of battery feed circuit. The battery feed circuit is equipped with resistors $R_{41}$, $R_{42}$, $R_{43}$, and $R_{44}$ and a capacitor $C_0$. The battery feed circuit of FIG. 7 contains the protection circuit shown in FIG. 2.

The supervising circuit 11 issues an indication to an operator that a short-circuit exists in the battery feed circuit. According to the indication, the operator starts the restoration of the circuit from a ground fault or a false connection condition. Note, the restoration per se is not the object of the present invention.

Next, a detailed explanation of the operational amplifier control circuit will be given. The inventors experimented with two methods of realizing the function of the operational amplifier control circuit 13 of FIG. 4 (same as the circuits 13-1 and 13-2 of FIG. 5). Namely, in one method, they connected a limiting resistor in series with the output of the operational amplifier, and in the other method, they cut off the power source ($V_{CC}$, $V_{BB}$) for the operational amplifier; i.e., when the operational amplifier is to be stopped, the power source is cut off.

The first method, had a defect in that the limiting resistor was not suitable for practical use; since such a limiting resistor must have a considerably high resistance, and such a high resistance value element is not easily fabricated in a large scale integration circuit (LSI).

The second method, had a defect in that the manufacturing process became complicated, since first a relatively wide power line must be partially removed and then an analog switch must be inserted into the removed part. Further, it is not preferable to cut off the power line, since the thus cut power line is liable to induce noise.

Under the above circumstance, the present inventors proposed a control circuit (13, 13-1, 13-2) which can smoothly stop or limit the output current of the operational amplifier and can be constructed with a simple design.

Figure 8:
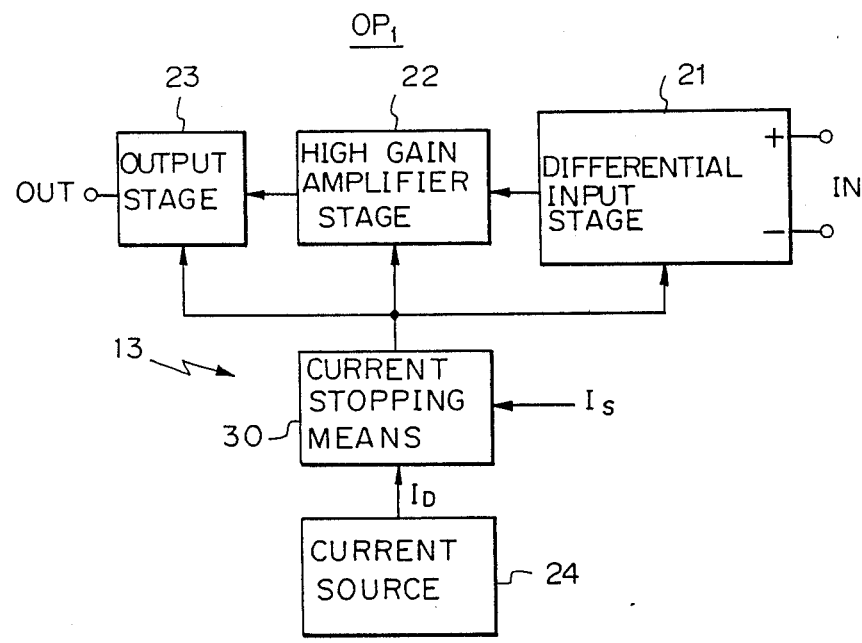
FIG. 8 is a block diagram including a control circuit according to the present invention and an operational amplifier.

FIG. 8 is a block diagram of a control circuit according to the present invention and an operational amplifier. In the figure, the operational amplifier $OP_1$ (same for $OP_{11}$ and $OP_{21}$) includes a differential input stage 21, a high gain amplifier stage 22, an output stage 23, and a current source 24 providing a driving current $I_D$ for driving the above-mentioned three stages 21, 22, and 23. The driving current $I_D$ can be made ON or OFF by a current stopping means 30. The current stopping means 30 corresponds to the aforesaid operational amplifier control circuit 13 (13-1, 13-2) and receives the second control signal, i.e., the stop control current $I_S$ (see $I_S$ in FIG. 4, and $I_{S1}$, $I_{S2}$ in FIG. 5).

The operational amplifier $OP_1$ is supplied with a driving current from the current source 24 and then performs the required operational amplifying function. Taking this into consideration, the driving current $I_D$ from the current source 24 is stopped to stop the operation of the operational amplifier per se, and thus the current stopping means 30 is incorporated into the well known operational amplifier $OP_1$.

Accordingly, the operation of the operational amplifier can be smoothly stopped without using the aforesaid limiting resistor at the output of the operational amplifier or inserting the aforesaid analog switch into the power line ($V_{CC}$, $V_{BB}$)

Figure 9:
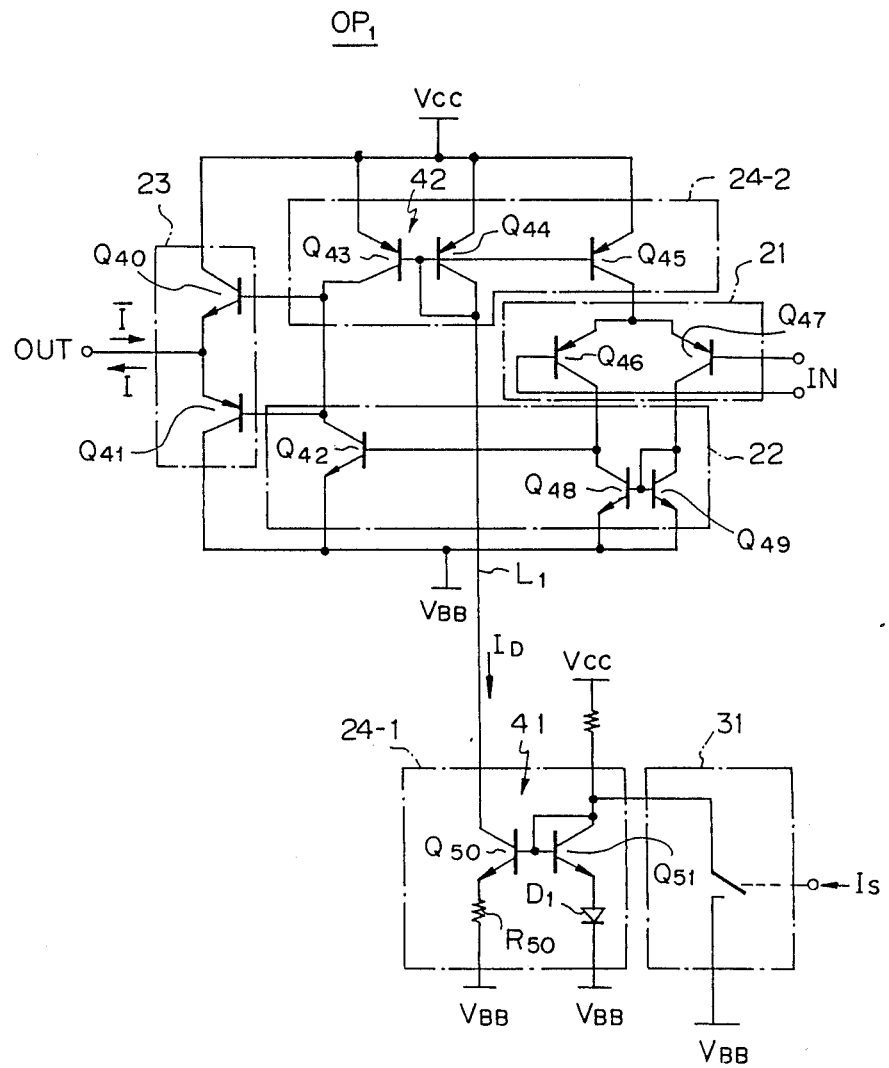
FIG. 9 is a circuit diagram showing an example of an operational amplifier control circuit according to the present invention.

FIG. 9 is a circuit diagram of an operational amplifier incorporating an example of an operational amplifier control circuit according to the present invention. A well known differential input stage 21 is comprised of transistors $Q_{46}$ and $Q_{47}$, a well known high gain amplifier stage 22 is comprised of transistors $Q_{42}$, $Q_{48}$, and $Q_{49}$, and a well known output stage 23 is comprised of transistors $Q_{40}$ and $Q_{41}$. Further, a well known current source 24 is provided with a constant current source 24-1, comprised of a current mirror circuit 41, and a current supply element 24-2 connected therewith via a current line $L_1$. The supply element 24-2 is provided with a current mirror circuit 42. The constant current source 24-1 contains a diode $D_1$ which produces the aforesaid driving current $I_D$ having a value which is determined by a division of the forward voltage of the diode $D_1$ by the resistance value of a resistor $R_{50}$. The driving current $I_D$ is given to each of the stages (21, 22, 23), via the current supply element 24-2, to drive the same.

The current stopping means 30, i.e., the operational amplifier control circuit 13 (13-1, 13-2), is schematically shown as a bypassing means 31. The bypassing means 31 is made conductive by the second control signal, i.e., the stop control current $I_S$, to bypass the current flowing through an input transistor $Q_{51}$ of the current mirror circuit 41. Accordingly, the driving current $I_D$ flowing through an output transistor $Q_{50}$ is also stopped, and thus the operation of the operational amplifier $OP_1$ is stopped.

Figure 10:
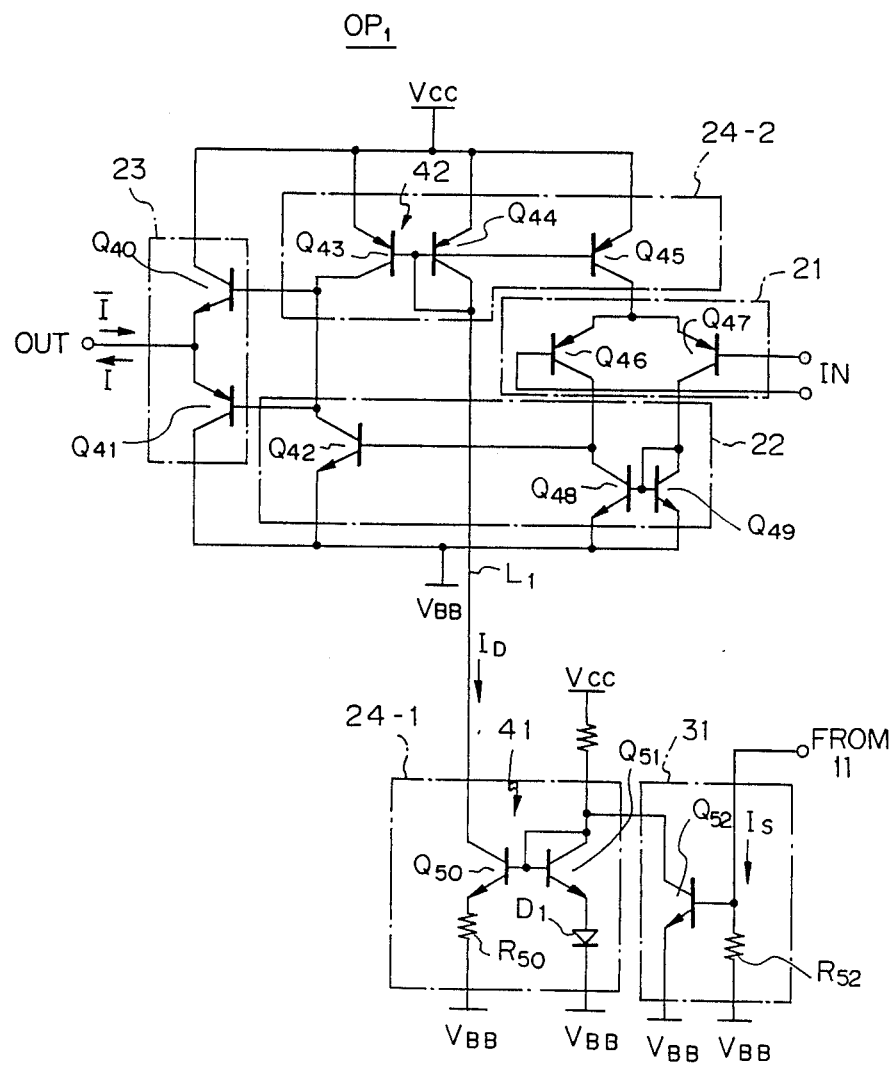
FIG. 10 is a detailed circuit diagram of an operational amplifier and a control circuit thereof shown in FIG. 9.

FIG. 10 is detailed circuit diagram of an operational amplifier and control circuit of FIG. 9. Namely, as shown in FIG. 10, the bypassing means 31 of FIG. 9 is specifically realized as a transistor $Q_{52}$, to which the stop control current $I_S$ is input at the base thereof, to saturate the transistor $Q_{52}$, and thus the collector-emitter voltage $V_{CE}$ is reduced, for example, to about 0.1 V through 0.2 V. Accordingly, the aforesaid forward voltage, usually about 0.7 V, of the diode $D_1$ is not applied to the resistor $R_{50}$, and thus the driving current $I_D$ is not generated. As a result, the operation of the operational amplifier $OP_1$ is stopped by the stop control current $I_S$.

Note, a commercially available operational amplifier is not equipped with an external terminal suitable for connection with the bypassing means 31 (transistor $Q_{52}$ and resistor $R_{52}$), and thus it is advisable to prefabricate the bypassing means 31 during the LSI process of the related circuit. Further, the LSI package should be provided with an input terminal (pin) for receiving the current $I_S$.

Next, the case of a B line ground fault will be discussed. Although it appears no problem arises in the case of an occurrence of a B line ground fault, in practice, a problem arises due to the presence of the operational amplifier $OP_1$ ($OP_{11}$), as explained below.

Figure 11:
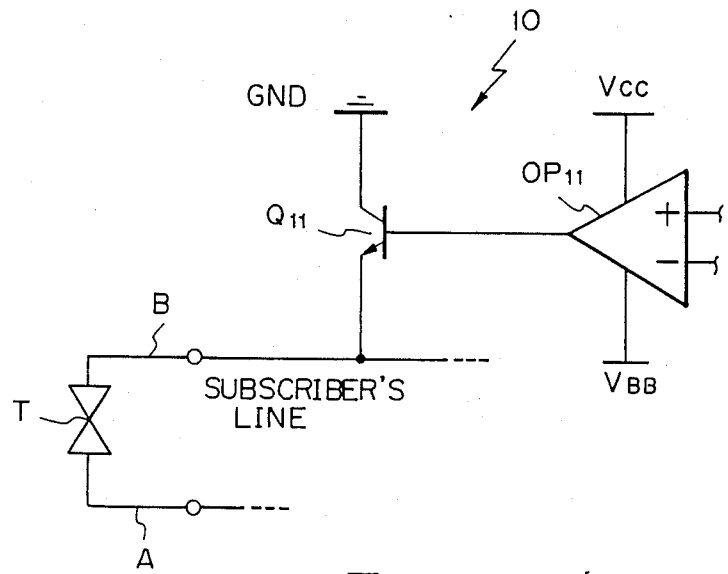
FIG. 11 is circuit diagram representing a battery feed circuit.
Figure 12:
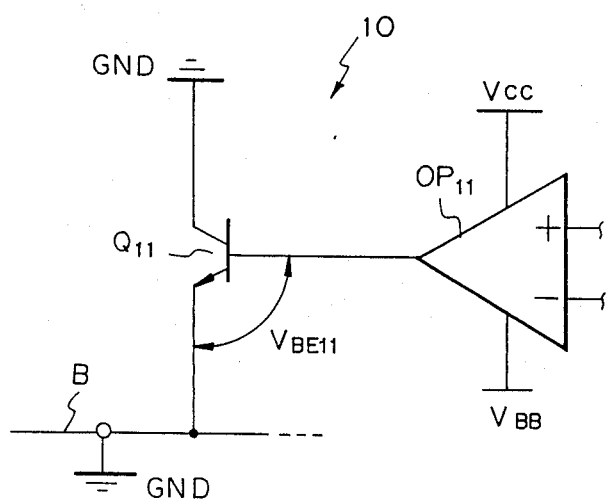
FIG. 12 is a schematic circuit diagram showing the circuit of FIG. 11 in which a B line ground fault has occurred.

FIG. 11 is simple circuit diagram representing a battery feed circuit. The battery feed circuit 10 is substantially the same as that described previously. FIG. 12 is a schematic circuit diagram representing the circuit of FIG. 11 in which a B line ground fault has occurred. In FIGS. 11 and 12, the characters $Q_{11}$, $OP_{11}$, B, T, A, $V_{CC}$, $V_{BB}$ and GND represent the same elements as in previous Figures.

In the battery feed circuit 10, if a B line ground fault occurs, the circuit is in the state shown in FIG. 12. Usually, the dynamic range in the voltage of the operational amplifier $OP_{11}$ is smaller than the positive power source voltage to be actually applied to the $OP_{11}$, and accordingly, a voltage higher than the ground level is used for the positive power source voltage to obtain an operational margin, which higher voltage is, for example, +5 V, i.e., $V_{CC}$. Due to the higher voltage $V_{CC}$, the output voltage of the operational amplifier $OP_{11}$ becomes higher than the ground level by a base-emitter voltage $V_{BE11}$ of the transistor $Q_{11}$, and accordingly, a positive voltage, sent from the base to the collector of the $Q_{11}$, appears. This produces an undesired current flowing from the output of the $OP_{11}$ to the ground GND connected to the collector of the $Q_{11}$. Also, an undesired current flowing from the base to the emitter of the $Q_{11}$ is generated. These undesired currents may damage the battery feed transistor $Q_{11}$.

The above-mentioned problem can be solved by the same measure as mentioned before with regard to the operational amplifier control circuit, i.e., the insertion of a high resistance element between the transistor $Q_{11}$ and the output of the amplifier $OP_{11}$. But it is very difficult to suitably set the resistance value in relation to the driving ability of the transistor $Q_{11}$, and further, such a high resistance value is not suitable for an LSI circuit.

The protection circuit for limiting the current through the battery feed transistor $Q_{11}$, which does not produce the disadvantage mentioned above, will be described below with reference to FIGS. 13 and 14.

Figure 13:
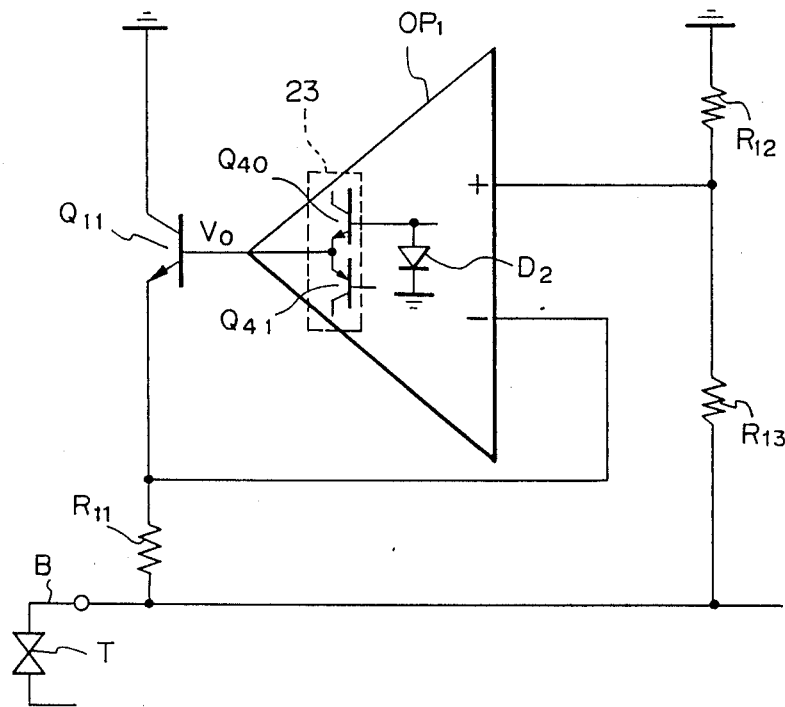
FIG. 13 is a general circuit diagram of a battery feed circuit containing a protection circuit for a B line false connection.

FIG. 13 is a general circuit diagram of a battery feed circuit containing a protection circuit for a B line false connection. In the figure, all members, other than a ground level clamping means, are the same as those mentioned before. The clamping means can be specifically realized as a diode (referenced by $D_2$), i.e., a voltage clamping diode. The transistor $Q_{40}$ of the output stage 23 (FIG. 9) is grounded, at the base thereof, by the voltage clamping diode for $D_2$. Alternatively, instead of the diode $D_2$, a transistor, connected in the form of a diode, can be used (described hereinafter), and thus the output voltage of the output stage 23 can be limited to suppress the aforesaid undesired current. As well known, the voltage, applied to the base of the $Q_{40}$, can be lower than the voltage across the diode $D_2$, i.e., the output voltage $V_0$ of the amplifier $OP_{11}$ is made lower than the voltage across the diode $D_2$ by the base-emitter voltage of the transistor $Q_{40}$. Therefore, the voltage $V_0$ is limited to the ground level, and the undesired current produced from the transistor $Q_{11}$ is stopped, even if the B line is erroneously grounded.

Figure 14:
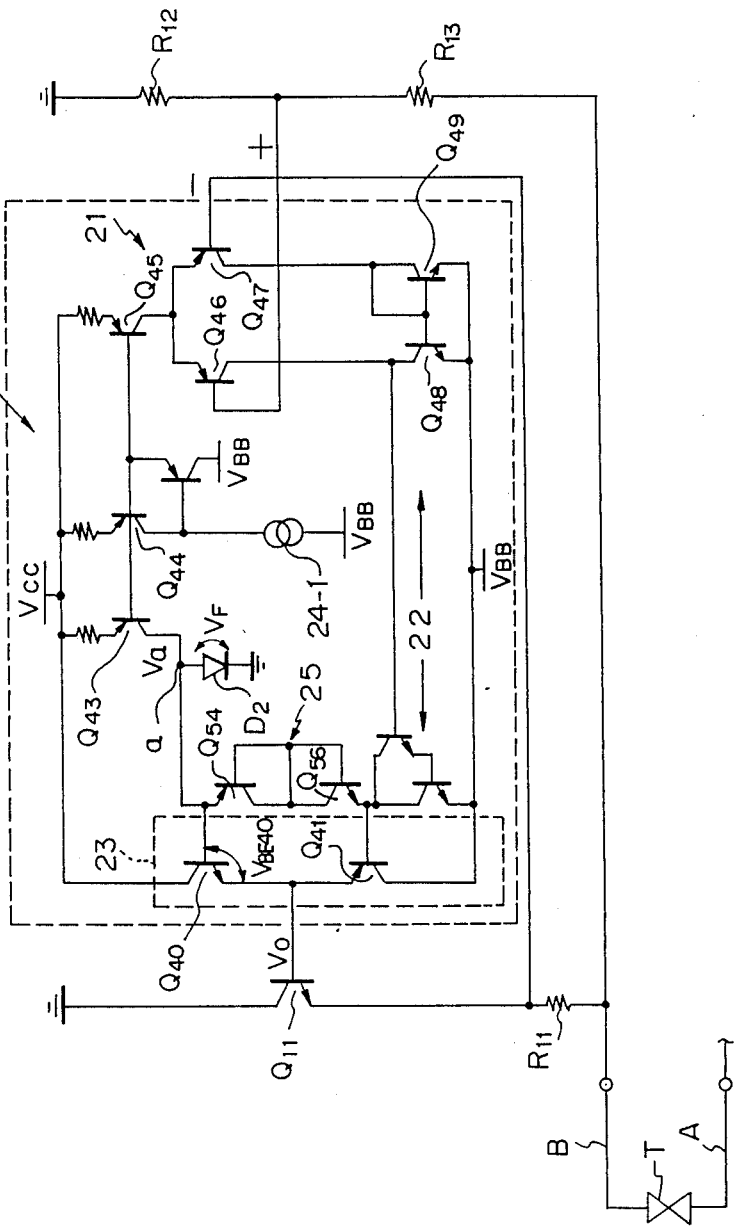
FIG. 14 is a detailed circuit diagram of an operational amplifier containing a protection circuit for the B line ground fault.

FIG. 14 is a detailed circuit diagram of an operational amplifier containing a protection circuit for the B line ground fault. Note, the operational amplifier of FIG. 14 is slightly different from that disclosed before, but the function thereof is substantially the same as previously described. In the operational amplifier $OP_{11}$ of FIG. 14, reference numeral 25 represents a bias generating circuit for the output stage 23, which circuit 25 is comprised of transistors $Q_{54}$ and $Q_{56}$. The base of the transistor $Q_{40}$ is connected to the ground GND by the voltage clamping diode $D_2$, to limit the potential at a point "a". Accordingly, the voltage potential at the point "a", relative to the ground GND, is limited by the forward voltage $V_F$. Note, this voltage $V_F$ is usually about 0.6 V through 0.7 V, when a silicon diode is used.

The output voltage $V_0$ of the amplifier $OP_{11}$ can be expressed as follows.

$$V_0 \leq V_a - V_{BE40}$$

where $V_{BE40}$ denotes the base-emitter voltage of the transistor $Q_{40}$, and $V_a$ is a voltage at the point "a". If the value $V_{BE40}$ is equal to the formed voltage $V_F$, the output voltage $V_0$ of the amplifier $OP_{11}$ can be made lower than zero volts by suitably setting the transistor $Q_{40}$ and the diode $D_2$.

Accordingly, the output voltage $V_0$ of the amplifier $OP_{11}$ does not become higher than the ground level, even if a B line ground fault occurs, which prevents the generation of the aforesaid undesired current of the transistor $Q_{11}$.

Figure 15:
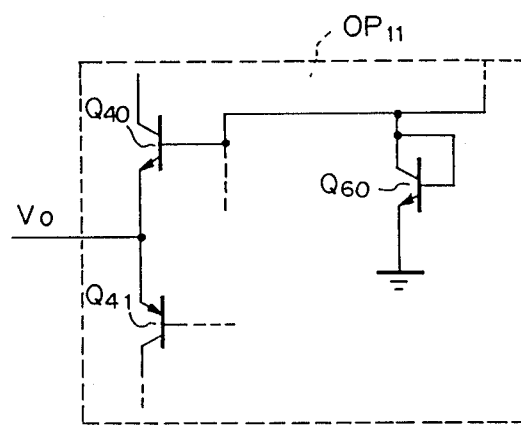
FIG. 15 shows another type voltage clamping diode.

FIG. 15 shows another type voltage clamping diode wherein the ground level clamping means is fabricated by a transistor $Q_{60}$ connected in the form of a diode. The transistor $Q_{60}$ is an NPN type and the emitter thereof is grounded, and the base and the collector thereof are connected to each other. The base-emitter voltage is utilized as the clamping voltage, which is usually about 0.6 V through 0.7 V, when silicon is used. If the transistors $Q_{40}$ and $Q_{60}$ have the same base-emitter voltage $V_{BE}$, the output voltage $V_0$ can be set lower than zero volt. Accordingly, a same conductivity type transistor as the transistor $Q_{40}$ is used, i.e., the NPN transistor $Q_{60}$. As is well known, transistors of the same conductivity type exhibit almost the same base-emitter voltage, on the same IC chip.

Finally, a circuit arrangement for ensuring protection against a B line false connection will be described below. The protection has already been explained with reference to FIG. 5.

Figure 16:
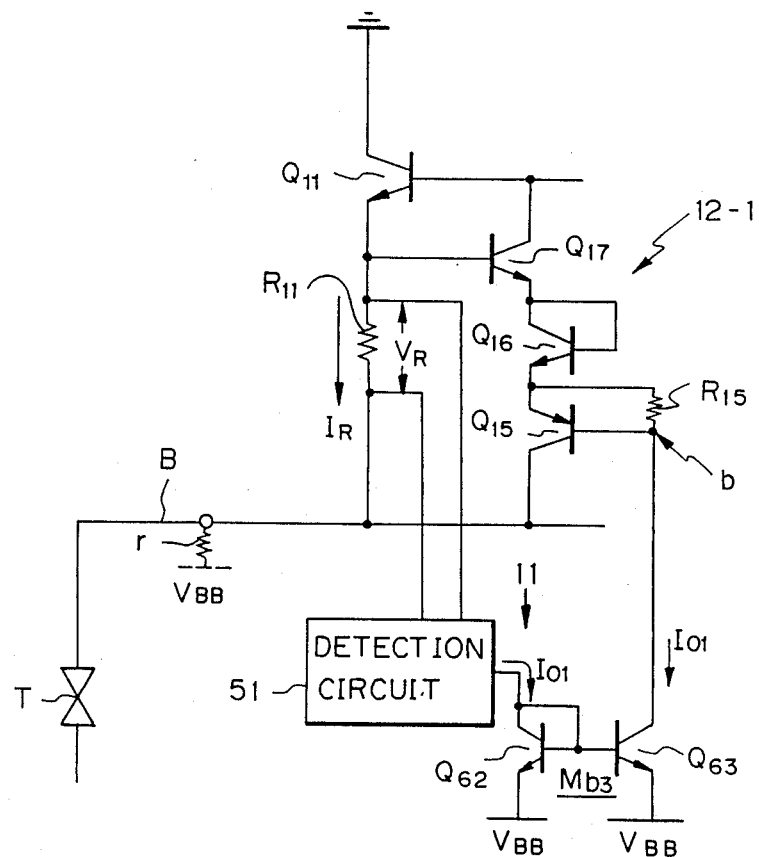
FIG. 16 is a circuit diagram representing a part of the circuit shown in FIG. 5; and, FIG. 17 depicts a circuit arrangement of a protection circuit without a resistor component.

FIG. 16 is a circuit diagram representing a part of the circuit shown in FIG. 5, and all members thereof, except for a detection circuit 51, have been already explained. Note, the detection circuit 51 has also been disclosed as the circuit of FIG. 6, except for the addition of the current mirror circuit $M_{b3}$.

When a false connection occurs on the B line side of the subscriber's line, an overcurrent flows through the battery feed resistor $R_{11}$ and the voltage thereacross is increased. In this case, the voltage at a point "b" is made higher than the voltage level of $V_{BB}$ by a voltage drop produced across a resistor component contained in the false connection, which resistor component is schematically expressed by a character "r" in FIG. 16. The detection circuit 51 detects the voltage across the battery feed resistor $R_{11}$ and the first control signal, i.e., the detection current $I_{01}$, is output therefrom. A current, identical to $I_{01}$ flows through a transistor $Q_{62}$, and through a transistor $Q_{63}$, and thus the transistor $Q_{15}$ is saturated.

Accordingly, a voltage $V_R$ across the resistor $R_{11}$ is expressed as follows:

$$V_R = V_{BE16} + V_{BE17} + V_{CE15(SAT)},$$

where $V_{BE16}$ and $V_{BE17}$ denote the base-emitter voltages of the corresponding transistors $Q_{16}$ an $Q_{17}$, and $V_{CE15(SAT)}$ is a collector-emitter saturation voltage of the transistor $Q_{15}$. Therefore, the current flowing through the resistor $R_{11}$ is limited to the value expressed as follows.

$$I_R = (V_{BE16} + V_{BE17} + V_{CE15(SAT)})/R_{11}$$

As mentioned above, if a false connection occurs, due to the resistor component r, the collector-emitter voltage $V_{CE63}$ of the transistor $Q_{63}$ can be fully maintained, so that the mirror circuit can $M_{b3}$ operate normally. Conversely, if the false connection occurs when the resistor component is omitted, the voltage at the point "b" of FIG. 16 becomes substantially equal to the voltage of $V_{BB}$. In this case, the collector-emitter voltage $V_{CE63}$ of the transistor $Q_{63}$ cannot be fully obtained, and thus the mirror circuit $M_{b3}$ cannot operate normally. Accordingly, it is not possible to saturate transistor $Q_{15}$, and thus the transistor $Q_{15}$ cannot operate to limit the voltage $V_R$ across the battery feed resistor $R_{11}$. Namely, an overcurrent continues to flow.

From the above viewpoint, the present inventors further propose a circuit arrangement of the protection circuit which will firmly suppress an overcurrent even if a false connection occurs, which false connection does not include the resistor component (r).

Figure 17:
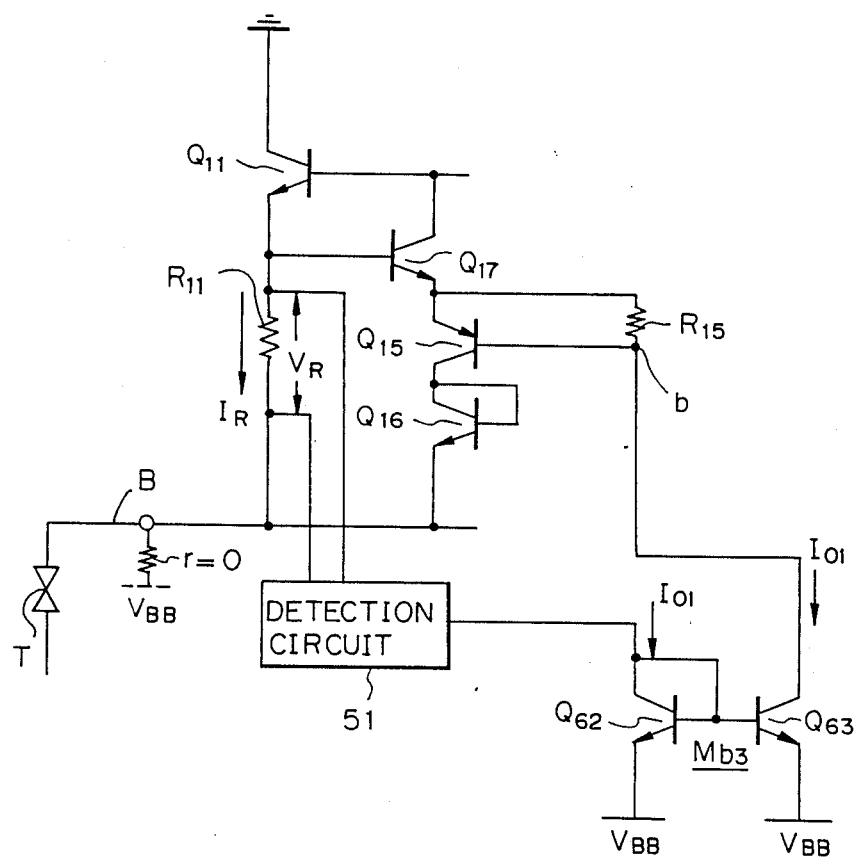

FIG. 17 depicts a circuit arrangement of a protection circuit to cope with a false connection not including a resistor component. The difference between FIG. 17 and FIG. 16 is that the order of arrangement of the transistors $Q_{15}$-$Q_{16}$-$Q_{17}$ in FIG. 16 is changed to $Q_{16}$-$Q_{15}$-$Q_{17}$ in FIG. 17. Thus, FIG. 17 illustrates the saturation transister $Q_{15}$ being sandwiched between transisters $Q_{16}$ and $Q_{17}$.

When the false connection occurs and the resistor component (r=0) is not included, the collector-emitter voltage of the transistor $Q_{63}$ comprising the mirror circuit $M_{b3}$ becomes nearly equal to the base-emitter voltage of the transistor $Q_{16}$ connected in the form of a diode. The voltage across the battery feed resistor $R_{11}$, when an overcurrent flows therethrough, is detected by the detection circuit 51, and the thus-detected current $I_{01}$ is output to the transistor $Q_{62}$ comprising the mirror circuit $M_{b3}$. An identical current $I_{01}$ is output through the transistor $Q_{63}$ to saturate transistor $Q_{15}$.

The voltage $V_R$ across the battery feed resistor $R_{11}$ is limited by the sum of the base-emitter voltages of the respective transistors $Q_{17}$ and $Q_{16}$ and the collector-emitter saturation voltage of the transistor $Q_{15}$. The transistor $Q_{15}$ is a saturation transistor, and the resistor $R_{15}$ connected between the base and emitter of $Q_{15}$ is used to divert a surplus current which is not needed for the saturation of $Q_{15}$. The transistor $Q_{16}$ is connected between the B line and the transistor $Q_{15}$, and thus the transistors $Q_{16}$, $Q_{15}$, and $Q_{17}$ operate to limit the voltage across the resistor $R_{11}$ in accordance with the detection current $I_{01}$ flowing through the mirror circuit $M_{b3}$.

Under normal conditions, the voltage across the resistor $R_{11}$ is low, and accordingly, the detection current $I_{01}$ is not produced from the detection circuit 51, and therefore, a current does not flow through the transistors $Q_{62}$ and $Q_{63}$, and thus the transistor $Q_{15}$ is not saturated, and the voltage across the resistor $R_{11}$ is not limited.

When a false connection occurs on the B line which does not include a resistor component (r=0), an overcurrent flows through the resistor $R_{11}$ and the voltage thereacross is increased, and thus the detection current $I_{01}$ is supplied to the transistor $Q_{62}$. At this time, the voltage at the point "b" is substantially equal to the base-emitter voltage of the transistor $Q_{16}$ connected in the form of a diode, and accordingly, the collector-emitter voltage can be fully ensured. Therefore, a current, identical to the $I_{01}$ flowing through the $Q_{62}$, also flows through the transistor $Q_{63}$, and thus the transistor $Q_{15}$ is saturated.

Note that, as mentioned previously, the operation of the aforesaid operational amplifier (not shown in FIG. 17) is stopped by turning the current source (24-1) thereof OFF under the control of the aforesaid control circuit (13-1).

Further, the voltage $V_R$ across the battery feed resistor $R_{11}$ is expressed as:

$$V_R = V_{BE17} + V_{BE16} + V_{CE15(SAT)},$$

where $V_{BE17}$ and $V_{BE16}$ denote the base-emitter voltages of the transistor $Q_{17}$ and $Q_{16}$, and $V_{CE15(SAT)}$ is the collector-emitter saturation voltage of the transistor $Q_{15}$.

Therefore, the battery feed current $I_R$ flowing through the resistor $R_{11}$ is limited as $$I_R = (V_{BE17} + V_{BE16} + V_{CE15(SAT)})/R_{11}.$$

This is the same as the $I_R$ obtained in the circuit of FIG. 16, when a false connection includes the resistor component r.

As explained above in detail, the present invention provides a protection circuit for a battery feed circuit in a switching system. The protection circuit can counteract a ground fault and/or false connection to limit an overcurrent flowing through each battery feed resistor. The protection circuit can be fabricated as an IC, and therefore, the protection circuit can have a very small size and a low power consumption.

We claim:

1. A protection circuit for a battery feed circuit, the battery feed circuit having A and B subscriber's lines for supplying a DC current from a supply to telephone terminal equipment, battery feed resistors connected to the A and B subscriber's lines, respectively, battery feed transistors, each having an emitter connected to one of the battery feed resistors, and operational amplifiers, each having an output connected to the base of one of the battery feed transistors, for applying predetermined voltages at the emitter of the battery feed transistor connected thereto, said protection circuit comprising:
   a supervising circuit, operatively connected to at least one of the battery feed resistors connected to the A and B subscriber's lines, for generating a first control signal upon detection of an abnormal current flowing through at least one of the battery feed resistors; and
   at least one voltage limiting circuit, operatively connected to said supervising circuit and a corresponding subscriber's line, for clamping a fixed voltage across the battery feed resistor connected to the corresponding subscriber's line, upon receipt of the first control signal from said supervising circuit.

2. A protection circuit as set forth in claim 1, wherein the corresponding subscriber's line is operatively connected to the input terminals of a corresponding operational amplifier, and
   wherein said at least one voltage limiting circuit is connected between the corresponding subscriber's line and one of the input terminals of the corresponding operational amplifier.

3. A protection circuit as set forth in claim 1, wherein a corresponding battery feed transistor is connected to the corresponding subscriber's line via one of the battery feed resistors, and
   wherein said at least one voltage limiting circuit is connected between the corresponding subscriber's line and the base of a corresponding battery feed transistor.

4. A protection circuit as set forth in claim 3, wherein the corresponding subscriber's line is operatively connected to a corresponding operational amplifier,
   wherein said supervising circuit issues a second control signal when an abnormal current flows through at least one of the battery feed resistors, and
   wherein said protection circuit further comprises an operational amplifier control circuit for stopping the operation of the corresponding operational amplifier upon receiving the second control signal from said supervising circuit.

5. A protection circuit as set forth in claim 4, further comprising at least one hold resistor, operatively connected to the base of the corresponding battery feed transistor, to hold the corresponding battery feed transistor in an active state after stoppage of the corresponding operational amplifier.

6. A protection circuit as set forth in claim 1, wherein said protection circuit is operatively connected to the A subscriber's line, thereby providing protection against a ground fault on the A subscriber's line.

7. A protection circuit as set forth in claim 1, wherein said protection circuit is operatively connected to the B subscriber's line, thereby providing protection against a false connection between a battery and the B subscriber's line.

8. A protection circuit as set forth in claim 2, wherein said voltage limiting circuit comprises:
   first, second and third transistors having substantially identical conductivities and connected in series, the first transistor being a saturation transistor having a base and an emitter, the base operatively connected to receive the first control signal, and each of the second and third transistors connected in the form of a diode, and
   a saturation resistor connected between the base and emitter of the first transistor.

9. A protection circuit as set forth in claim 3, wherein said voltage limiting circuit comprises:
   a first transistor having a base operatively connected to receive the first control signal;

a second transistor, connected as a diode in series with said first transistor, said first and second transistors having a first conductivity type; and a third transistor having a second conductivity type and a base operatively connected to the emitter of the corresponding battery feed transistor.

10. A protection circuit as set forth in claim 4,
wherein the corresponding operational amplifier has a differential input stage, a high gain amplifier stage, an output stage, and a current source for supplying a driving a current to the differential input, high gain amplifier and output stages, and wherein said operational amplifier control circuit comprises current stopping means for turning the driving current ON and OFF.

11. A protection circuit as set forth in claim 10,
wherein the current source of the corresponding operational amplifier has a constant current source comprising a current mirror circuit having an input transistor, wherein said current stopping means comprises bypassing means connected in parallel with the input transistor of the current mirror circuit, and wherein the operation of the corresponding operational amplifier is stopped when said bypassing means is made conductive.

12. A protection circuit as set forth in claim 11, wherein said bypassing means comprises a transistor switch having a base receiving the second control signal for turning ON said bypassing means.

13. A protection circuit as set forth in claim 10, further comprising ground level comprising means, operatively connected to the corresponding operational amplifier, for clamping an output voltage of the output stage of the corresponding operational amplifier at ground level to prevent an undesired current from flowing through the corresponding battery feed transistor on the B subscriber's line.

14. A protection circuit as set forth in claim 13,
wherein the output stage of the corresponding operational amplifier has first and second output transistors, the first output transistor having a collector connected to a positive power source and a base, and wherein said ground level clamping means comprises a voltage clamp diode connected between ground and the base of the first output transistor.

15. A protection circuit as set forth in claim 14,
wherein said voltage clamp diode comprises a voltage clamp transistor connected in the form of a diode, having a conductivity type identical to the conductivity type of the first output transistor, and wherein said operational amplifier is fabricated on a single IC chip with the voltage clamp transistor.

16. A protection circuit as set forth in claim 9,
wherein said first transistor is sandwiched by said second and third transistors, whereby said first transistors can be saturated when a false connection occurs between the B subscriber's line and the supply of the DC current, even if the B subscriber's line has a resistor component equal to zero.

17. A protection circuit as set forth in claim 4,
wherein said voltage limiting circuit comprising:

a first transistor having a base operatively connected to receive the first control signal;

a second transistor, connected as a diode in series with said first transistor, said first and second transistors having a first conductivity type; and a third transistor having a second conductivity type and a base operatively connected to the emitter of the corresponding battery feed transistor.

18. A protection circuit as set forth in claim 17,
wherein said third transistor has a collector connected to the base of the corresponding battery feed transistor, and wherein said third transistor has an emitter connected to an emitter of said second transistor.

19. A protection circuit as set forth in claim 17,
wherein the corresponding operational amplifier has a differential input stage, a high gain amplifier stage, an output stage, and a current source for supplying a driving current to the differential input, high gain amplifier and output stages, and wherein said operational amplifier control circuit comprises current stopping means for turning the driving current ON and OFF.

* * * * *

UNITED STATES PATENT AND TRADEMARK OFFICE
CERTIFICATE OF CORRECTION

PATENT NO. : 4,862,309

DATED : August 29, 1989

INVENTOR(S) : Tojo et al.

It is certified that error appears in the above-identified patent and that said Letters Patent is hereby corrected as shown below:

Col. 1, line 53, change "shown," to --shown--;

Col. 5, line 40, change "$Q_{26}$is" to --$Q_{26}$ is--;

Col. 6, line 19, change "tat" to --that--;

Col. 7, line 29, change "turn" to --turns--;

Col. 7, line 60, change "current voltage also" to --voltage drop--;

Col. 15, line 34, change "comprising means" to --clamping means--;

Col. 15, line 40, before "on" insert --during a ground fault--;

Col. 16, line 15, change "first transistors" to --first transistor--.

Signed and Sealed this

Third Day of July, 1990

Attest:

HARRY F. MANBECK, JR.

*Attesting Officer*       *Commissioner of Patents and Trademarks*